S. Morrill,
Clothes Drier.
No. 830. Reissued Sep. 27, 1859.
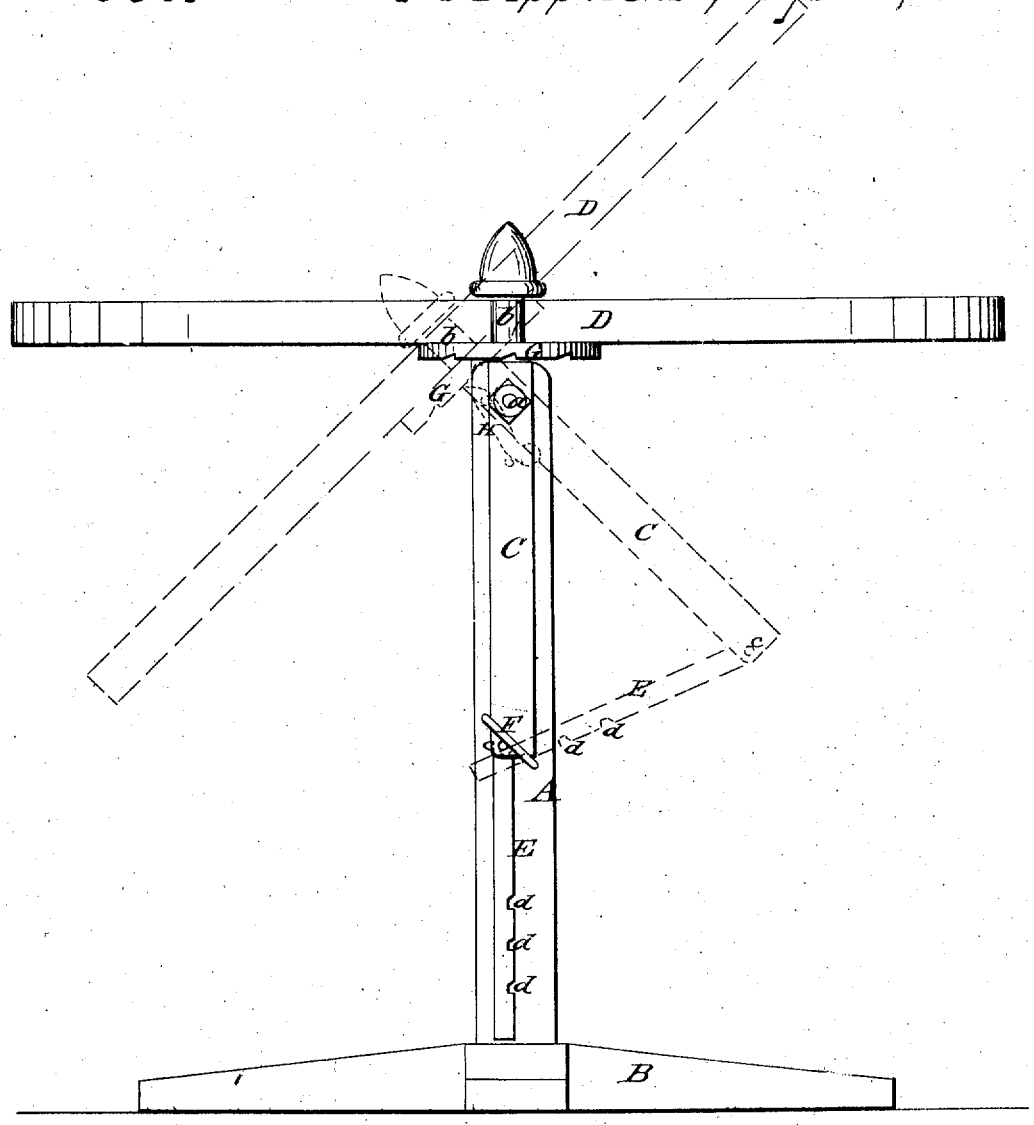

UNITED STATES PATENT OFFICE.

SAMUEL MORRILL, OF ANDOVER, NEW HAMPSHIRE.

IMPROVEMENT IN CLOTHES-DRIERS.

Specification forming part of Letters Patent No. 15,065, dated November 11, 1856; Reissue No. 830, dated September 27, 1859.

*To all whom it may concern:*

Be it known that I, SAMUEL MORRILL, of Andover, Merrimack county, and State of New Hampshire, have invented a new and Improved Clothes-Drying Machine; and I do hereby declare the following to be a full, clear, and exact description of the same, reference being had to the accompanying drawings, figures, and letters of reference thereon, making part of this specification.

Prior to the date of my invention clothes-driers have been constructed with a rotating reel arranged upon a post, which required an elevated position and high reaching to enable a person to place the clothes thereon, or the post short, so that the clothes, when suspended on the lines, would be within the reach of animals, evil-disposed persons, and also inconvenient to persons passing under them.

The nature and object of the first part of my invention is to obviate these difficulties by tilting down the reel to enable a person to place the clothes on the lines (secured to the reel) from the ground without high reaching, and when placed thereon to be elevated from the reach of animals, persons, and other annoyances, and in a good position to dry, which is highly requisite in cities where yards are inclosed by high fences.

The nature of the second part of my invention consists in arranging and combining with the reel a mechanism for holding it in the desired position and preventing backward rotary motion when adjusting the clothes on the lines, as will be fully explained hereinafter.

The last part of my invention consists in arranging and combining with the rotating reel a mechanism for tilting and elevating the reel, as will be explained hereinafter.

To enable others skilled in the art to make and use my invention, I will describe its construction and operation.

A represents a vertical post, the lower end of which is secured to a proper base, B, or inserted in the ground. C is an arm which is tached by a bolt or pivot, *a*, to one side of the post A, the arm C being allowed to turn on the bolt or pivot *a*. To the upper end of the arm C there is attached a journal or rod, *b*, on which the reel D is fitted. The reel D is composed of the desired number of arms, (which are inserted in a metallic head arranged with recesses to receive them, or otherwise properly adjusted,) and is provided with cords, (attached to pins,) on which the clothes are secured, and the reel is permitted to turn freely on the journal *b*. The lower end of the arm C has a bar, E, jointed to it at *c*, and is provided with notches *d*, and works through an oblique loop or staple, F, attached to the post A. To the under side of the reel D there is attached a ratchet, G, which may be cast on the metallic head or properly secured to the arms, and to one side of the upper end of the post A there is attached a pawl, H, (see dotted lines,) which catches into the ratchet G when the reel D is tilted, and prevents the reel from backward rotary motion, as the side is weighted with clothes and turned along to present the empty line. When the clothes are to be placed on the reel, the bar E is raised up by hand to nearly a horizontal position and pushed through the staple F, and the arm C is turned on the bolt or pivot *a*, and the reel D is consequently tilted or brought into a vertical or approximating to a vertical position as desired to place the clothes on the lines and held in place by means of the notches *d*, grasping the loop F. The reel may have any degree of inclination, as more or less notches are made in the arms E. As the clothes are placed upon the lines and moved along, the pawl H will catch into the ratchet G and prevent the reel D from backward motion. The clothes being secured to the lines, the reel is elevated by grasping the handle and drawing it through the loop F until the reel reaches a horizontal position, and by dropping the handle F its gravity forms a permanent fastening to hold the reel, and it may be secured by lock, if desired. The object in thus arranging the reel so that it may be tilted is to facilitate the placing on and removing the clothes upon and from the lines with ease, without high reaching to elevate them high enough to be in good position to dry, out of the way and above the heads of those passing under them, and preventing danger from soiling from animals or persons.

I do not confine myself to any precise mechanism for tilting the reel, as various modifications of the plans herein described and shown may be used.

Having thus fully described my invention, what I claim as new, and desire to secure by Letters Patent, is—

1. Tilting the reel to the desired position to enable a person to place the clothes on the lines without high reaching and elevate them in good position to dry, and out of the way of injury, substantially as set forth.

2. Arranging and combining with a rotary tilting reel the ratchet *d* and pawl H, or their equivalents, for preventing backward rotary motion of the reel as the clothes are placed on the lines and moved along, substantially as set forth.

3. Operating the reel by the combined action of the arm C, jointed arm or lever E, and loop or staple F, or its equivalent, substantially as set forth, and for the purpose specified.

SAMUEL MORRILL.

Witnesses:

WM. S. MARSTON,

DANIEL FARNUM.